(12) United States Patent
Spieles et al.

(10) Patent No.: US 12,514,277 B2
(45) Date of Patent: Jan. 6, 2026

(54) HOT PRESSED TOBACCO SUBSTRATE

(71) Applicant: JT International SA, Geneva (CH)

(72) Inventors: Sandra Spieles, Trier (DE); Erwin Dahlem, Trier (DE)

(73) Assignee: JT International SA (CH)

( * ) Notice: Subject to any disclaimer, the term of this patent is extended or adjusted under 35 U.S.C. 154(b) by 694 days.

(21) Appl. No.: 17/776,116

(22) PCT Filed: Nov. 11, 2020

(86) PCT No.: PCT/EP2020/081752
§ 371 (c)(1),
(2) Date: May 11, 2022

(87) PCT Pub. No.: WO2021/094365
PCT Pub. Date: May 20, 2021

(65) Prior Publication Data
US 2022/0386681 A1 Dec. 8, 2022

(30) Foreign Application Priority Data
Nov. 15, 2019 (EP) .................... 19209346

(51) Int. Cl.
*A24B 15/167* (2020.01)
*A24B 3/14* (2006.01)
(Continued)

(52) U.S. Cl.
CPC .............. *A24B 15/167* (2016.11); *A24B 3/14* (2013.01); *A24B 15/14* (2013.01); *A24B 15/302* (2013.01);
(Continued)

(58) Field of Classification Search
None
See application file for complete search history.

(56) References Cited

U.S. PATENT DOCUMENTS

| | | | | |
|---|---|---|---|---|
| 4,135,962 A | * | 1/1979 | Sinclair | .................... A24B 3/14 |
| | | | | 118/224 |
| 4,893,639 A | | 1/1990 | White | |

(Continued)

FOREIGN PATENT DOCUMENTS

| | | |
|---|---|---|
| CN | 101128130 A | 2/2008 |
| CN | 104366687 A | 2/2015 |

(Continued)

OTHER PUBLICATIONS

CN108236130A Description English Translation obtained from Espacenet, pp. 1-8 (Year: 2025).*

(Continued)

*Primary Examiner* — Philip Y Louie
*Assistant Examiner* — Virginia R Bieger
(74) *Attorney, Agent, or Firm* — Lerner David LLP (57) ABSTRACT

A method brings an aerosol releasing substrate for use in a heat-not-burn device into a stable shape, wherein the aerosol releasing substrate contains: 20-70% aerosol former as well as tobacco particles and/or an inhalable agent, which contains at least one of a stimulant and/or a flavor. The aerosol releasing substrate also contains a gelling agent for gelling the aerosol releasing substrate and a degradation preventing and/or thickening stabilizer. The method includes the steps of: a) producing the aerosol releasing substrate and b) pressing the aerosol releasing substrate with pressure and heat and by using a mold into a desired shape. An aerosol releasing substrate for use in a heat-not-burn device, is an air permeable compressed mass and includes tobacco particles and/or an inhalable agent, a gelling agent, a degradation preventing and/or thickening stabilizer, as well as 20-70% aerosol former.

10 Claims, 2 Drawing Sheets

(51) Int. Cl.
  *A24B 15/14* (2006.01)
  *A24B 15/30* (2006.01)
  *A24C 5/01* (2020.01)
  *A24D 1/20* (2020.01)
  *A24F 40/20* (2020.01)

(52) U.S. Cl.
  CPC .............. *A24C 5/01* (2020.01); *A24D 1/20* (2020.01); *A24F 40/20* (2020.01)

(56) References Cited

U.S. PATENT DOCUMENTS

| | | | |
|---|---|---|---|
| 5,240,016 | A | 8/1993 | Nichols et al. |
| 9,307,787 | B2 | 4/2016 | Sun et al. |
| 2007/0000505 | A1 | 1/2007 | Zhuang et al. |
| 2012/0006343 | A1 | 1/2012 | Renaud et al. |
| 2012/0042885 | A1 | 2/2012 | Stone et al. |
| 2013/0160779 | A1 | 6/2013 | Chida et al. |
| 2015/0010687 | A1 | 1/2015 | Batori et al. |
| 2016/0120224 | A1 | 5/2016 | Mishra et al. |
| 2016/0205998 | A1 | 7/2016 | Matsumoto et al. |
| 2016/0295922 | A1* | 10/2016 | John ................. A24F 40/46 |
| 2017/0119049 | A1* | 5/2017 | Blandino ............ A24F 40/46 |
| 2018/0029782 | A1 | 2/2018 | Zuber et al. |
| 2018/0220696 | A1 | 8/2018 | Gao et al. |
| 2018/0368472 | A1 | 12/2018 | Mishra et al. |
| 2019/0150512 | A1 | 5/2019 | Furudono |
| 2020/0163377 | A1 | 5/2020 | Franke et al. |

FOREIGN PATENT DOCUMENTS

| | | | | |
|---|---|---|---|---|
| CN | 104758564 | A | 7/2015 | |
| CN | 104770853 | A | 7/2015 | |
| CN | 107307466 | A | 11/2017 | |
| CN | 108095199 | A | 6/2018 | |
| CN | 108236130 | A | 7/2018 | |
| CN | 108835707 | A | 11/2018 | |
| EP | 0509657 | A1 | 10/1992 | |
| EP | 3138424 | A1 | 3/2017 | |
| EP | 3735842 | A1 | 11/2020 | |
| JP | 2013544521 | A | 12/2013 | |
| JP | 201893884 | A | 6/2018 | |
| JP | 2019141013 | A | 8/2019 | |
| JP | 2019526242 | A | 9/2019 | |
| WO | 2012023515 | A1 | 2/2012 | |
| WO | 2012074865 | A1 | 6/2012 | |
| WO | 2015071682 | A1 | 5/2015 | |
| WO | 2016184977 | A1 | 11/2016 | |
| WO | WO-2017202965 | A1 * | 11/2017 | ............. A24F 40/70 |
| WO | 2018016030 | A1 | 1/2018 | |
| WO | 2018019578 | A1 | 2/2018 | |
| WO | 20180122375 | A1 | 7/2018 | |
| WO | 2019016535 | A1 | 1/2019 | |
| WO | 2019100545 | A1 | 5/2019 | |
| WO | 2019135618 | A1 | 7/2019 | |
| WO | 2019193210 | A1 | 10/2019 | |
| WO | WO-2020028468 | A1 * | 2/2020 | ............. A24B 15/12 |

OTHER PUBLICATIONS

Search Report dated Sep. 29, 2022 from the Office Action for Chinese Application No. 202080078154.6 issued Oct. 17, 2022, 3 pages.
Search Report dated Sep. 30, 2022 from the Office Action for Chinese Application No. 202080078161.6 issued Oct. 17, 2022, 3 pages.
International Search Report for Application No. PCT/EP2020/081753 mailed Feb. 4, 2021. 4 pgs.
International Search Report for Application No. PCT/EP2020/081752 mailed Feb. 4, 2021, 5 pgs.

* cited by examiner

HOT PRESSED TOBACCO SUBSTRATE

CROSS-REFERENCE TO RELATED APPLICATIONS

The present application is a national phase entry under 35 U.S.C. § 371 of International Application No. PCT/EP2020/081752, filed Nov. 11, 2020, published in English, which claims priority to European Application No. 19209346.6 filed Nov. 15, 2019, the disclosures of which are incorporated herein by reference.

FIELD OF THE INVENTION

The present invention relates to a method to bring an aerosol releasing substrate for use in a heat-not-burn device into a stable shape, wherein the aerosol releasing substrate contains at least 20-70% of an aerosol former as well as tobacco particles and/or an inhalable agent. The method comprises the steps of: a) Producing said aerosol releasing substrate and b) pressing said aerosol releasing substrate with pressure and heat into a desired shape. The invention also relates to an aerosol releasing substrate, which is an air permeable compressed mass.

BACKGROUND OF THE INVENTION

Tobacco products are popular and widespread. Generally tobacco is used in a variety of forms, such as smoke- and smokeless products. Primarily, tobacco is smoked as a combustible cigarette with a risk factor for especially affecting the lungs due to combustion products. Therefore, other tobacco products, such as smokeless tobacco became popular so that tobacco can be enjoyed with reduced risk. Those smokeless tobacco products can be designed in many ways, e.g. with additional flavors to increase the experience during consumption.

To be suitable for an oral and non-combustible consumption, many oral tobacco products were developed. US20180220696 and U.S. Pat. No. 9,307,787, both represent oral consumable tobacco products with tobacco as main constituent and some other components.

However, electronic cigarettes (e-cigarettes) came with the need and possibility for novel tobacco products to be vaporized and inhaled by smokers, and to avoid combustion products. Usually those E-cigarettes or similar devices like electronic pipes generate an aerosol by heating a liquid containing flavors, an aerosol forming agent, such as water and optionally nicotine. However, this can lead to an uneven smoking profile, wherein the experienced flavor of puffs can differ significantly, e.g. by an inefficient extraction of key compounds in the liquid. Therefore, consumers search for alternative to tobacco products to be heated but not burned.

Meanwhile heat-not-burn devices, with which tobacco can be heated instead of burned became popular. Those heat-not-burn devices provide tobacco based vapor and can be filled with a couple tobacco products that will be heated up to around 350° C. by activating an electronic heater. Tobacco products suitable for use in a heat-not-burn device need a high surface area and at least a certain amount of an aerosol forming agent. Such tobacco products are e.g. tobacco sticks, or simply reconstituted tobacco. Tobacco sticks comprise shredded tobacco leaves that are pressed into sticks, contain a low amount of humectant and are surrounded by a plastic capsule. Common tobacco articles for use in a heat-not-burn device, such as tobacco sticks have a low amount of humectant to be vaporizable and moreover are very large due their low amount of vape generated by the low level of humectant. The large size of these articles makes them unwieldy and heat-not-burn devices should also be very large to accommodate the tobacco article. Moreover, the shape of conventional tobacco articles for use in a heat-not-burn device is unstable during smoking, resulting in a collapse of the structure of such articles.

BRIEF SUMMARY OF THE INVENTION

It is therefore the objective of the invention to provide a method to produce a vapor generating substrate that is smaller than conventional articles and at the same time has a solid stable form and is able to deliver a vapor volume similar or increased to conventional articles. Thus the produced vapor generating substrate should be smaller than conventional articles but without a reduced vapor volume to be delivered and therefore it should be more effective.

The afore-mentioned problems are eliminated by a method to bring an aerosol releasing substrate for use in a heat-not-burn device into a stable shape, wherein the aerosol releasing substrate contains: 20-70% aerosol former as well as tobacco particles and/or an inhalable agent, which contains at least one of a stimulant and/or a flavor. The aerosol releasing substrate also contains a gelling agent for gelling the aerosol releasing substrate and a degradation preventing and/or thickening stabilizer. The gelling agent participates to soft texture of the substrate when pressed into a sheet. Without gelling agent, the substrate would become too hard and brittle when compressed. The stabilizer acts as a binder to make and keep the substrate crumby. The method comprises the steps of: a) Producing said aerosol releasing substrate and b) pressing said aerosol releasing substrate with pressure and heat and by using a mold into a desired shape.

As conventional substances are low (<20 wt. %) in aerosol formers or are crumby and brittle, it is advantageous to be able to bring an aerosol releasing substrate with higher amounts (<20 wt. %) of aerosol formers into a desired shape. Using pressure, heat and a mold, it is possible to bring the aerosol releasing substrate into any desired shape.

Preferably the weight of the aerosol former is greater than 25 wt.-%, preferably greater than 30 wt.-% and preferably greater than 35 wt.-% of the weight of the aerosol releasing substrate and/or the weight of the tobacco and/or inhalable agent is smaller than 70 wt.-%, preferably smaller than 60 wt.-%, preferably smaller than 50 wt.-% of the weight of the aerosol releasing substrate. Most preferably the aerosol former is about 40% of the aerosol releasing substrate.

Preferably the weight of the tobacco and/or inhalable agent is greater than 5 wt.-%, preferably greater than 10 wt.-% and preferably greater than 20 wt.-% of the weight of the aerosol releasing substrate and/or the weight of the tobacco and/or inhalable agent is smaller than 70 wt.-%, preferably smaller than 60 wt.-%, preferably smaller than 50 wt.-% of the weight of the aerosol releasing substrate. Most preferred is an amount of tobacco of between 30% and 50% of the weight of the substrate. This ensures a sufficient amount of tobacco flavor and stimulant in the substrate. If the amount of tobacco is increased above e.g. 50 wt. % of the weight of the substrate, the amount of other constituents, e.g. aerosol former or stabilizer must be reduced, so that the substrate may become too brittle and unstable to keep the desired shape after pressing.

Preferably, the tobacco and/or inhalable agent can preferably be any compound, mixture, particle matter and/or solution that may be inhaled, for example as a gas and/or aerosol, and it e.g. includes and/or carries at least one of a stimulant, e.g. caffeine, guarana and combinations thereof. The tobacco may further contain essentially at least one sort of tobacco, preferred a blend of at least two or more different sorts of tobacco. With a blend of different sorts of tobacco the taste is adjustable and can be adjusted to a preferred taste of the consumer.

Preferably, the inhalable agent and/or the flavor may contain menthol, natural and/or artificial plant flavors, saccharides, animal flavors, other flavorings known for use in conventional e-liquids e.g. cinnamon, sage, herb, chamomile, kudzu (Pueraria lobata), Hydrangeae dulcis folium, clove, lavender, cardamom, caryophyllus, nutmeg, bergamot, geranium, honey essence, rose oil, lemon, orange, cassia bark, caraway, jasmine, ginger, coriander, vanilla extract, spearmint, peppermint, cassia, coffee, celery, cascarilla, sandalwood, cocoa, ylang ylang, fennel, anise, licorice, St John's bread, prune extract, and peach extract; saccharides, e.g., glucose, fructose, isomerized saccharide, and caramel; cocoa, e.g., powder and extract; esters, e.g., isoamyl acetate, linalyl acetate, isoamyl propionate, and linalyl butyrate; ketones, e.g., menthone, ionone, damascenone, and ethyl maltol; alcohols, e.g., geraniol, linalool, anethole, and eugenol; aldehydes, e.g., vanillin, benzaldehyde, and anisaldehyde; lactones, e.g., γ-undecalactone and γ-nonalactone; animal flavors, e.g., musk, ambergris, civet, and castoreum; and hydrocarbons, e.g., limonene and pinene, and combinations thereof, without being limited thereto. Such a flavor or others can be used alone or in combination. It is also possible that the inhalable agent and/or flavor and/or a combination of flavors may be combined with at least one or more sorts of tobacco, so that the taste of the substrate is adjustable to an optimum of a preferred taste of the consumer.

Preferably, the aerosol former comprises glycerol, propylene glycol, ethanol and/or water. It is also possible, that the aerosol former comprises other alcohols and/or glycol derivatives, sebacate esters, and/or mixtures thereof, without being limited thereto. A glycol derivative that can be used in certain embodiments is propylene glycol, and a suitable sebacate ester can be di-2-ethylhexyl sebacate. Furthermore, any possible combinations of compounds belonging to the above mentioned classes can be used. For example, a combination of glycerol and propylene glycol can be used as aerosol forming agent. Most of these aerosol formers are tasteless and thus do not cover the original taste of tobacco, extracts of tobacco and/or inhalable agents, such as flavors. However, a tasteless aerosol former is still capable of generating aerosol and vape that carries the taste of the tobacco, extracts of tobacco and/or inhalable agents, such as flavors. Furthermore the aerosol former contributes to the consistence and formability of the substrate.

Preferably, the stabilizer comprises carboxymethylcellulose and/or hydroxyalkylated carbohydrates. Preferably used is a purified carboxymethylcellulose, such as Ceroga 4550 C or CEKOL® 2000 (C.E. Roeper GmbH). Stabilizers, such as carboxymethylcellulose acts as a binder to make the substrate crumbly and also prevents its degradation and thickens it.

Preferably, the gelling agent is a non-protein containing polysaccharide and/or comprise gellan gum, lecithin, agar and/or mixtures thereof. The gelling agent, especially gellan gum, and preferably Gellan gum Roeper 700f, jellifies the substrate so that it is formable. The gelling agent keeps the substrate soft and fluffy. Without the gelling agent, the substrate would become too hard and could become too brittle.

It is further conceivable that temperatures above 60° C., preferably above 80° C., preferably above 90° C. and/or temperatures below 200° C., preferably below 160° C., preferably below 130° C., are used. Ideally, the temperature range is between 100° C. and 110° C. By using such temperatures the consistence of the aerosol releasing substrate is especially soft to form it into the desired shape. Further, there is a high risk that aerosol releasing substrate loses aerosol formers due to evaporation taking place at temperatures higher than 200° C. At temperatures below 60° C. the aerosol releasing substrate may be too brittle to form.

Preferably, the substrate is produced in step a by mixing the aerosol former with tobacco particles and/or an inhalable agent, the gelling agent and the degradation preventing and/or thickening stabilizer, followed by aging the mixture for at least 4 hours, preferably at least 12 hours. Preferably, the aging is followed by sieving the substrate, the sieving enable to obtain a granular form of the substrate. Sieving is preferably carried out at a granular size lower than 2 mm, preferably lower than 1.7 mm.

According to a preferred embodiment the aerosol releasing substrate is pressed in the mold by press forming the substrate under the desired thickness under pressures above 1 bar, preferably above 3 bars, preferably above 5 bars and/or pressures below 50 bars, preferably below 30 bars, preferably below 20 bars. Pressures of between 1 and 50 bars are the best conditions to form the aerosol releasing substrate and to keep pores in the aerosol releasing substrate which are necessary to ensure a sufficient release of aerosol. Using pressures higher than 50 bars will result in an extremely hard and brittle substrate that does not have pores anymore.

In a preferred embodiment, the aerosol releasing substrate is wrapped in paper sheet layer. Preferably the aerosol releasing substrate is wrapped in paper sheet layer after pressing the aerosol into its desired shape. Ideally, the paper sheet is permeable to vapor during smoking and/or able to absorb the aerosol in an oven area of a vaping device after smoking. It may also be possible that paper sheet is able to avoid a shrinking and/or scorching shape. Preferably, the thickness of the paper sheet does not exceed 100 microns, preferably 80 microns, preferably 60 micron and is above 20 microns, preferably 30 microns, preferably 40 microns. Ideally, the thickness is between 40 microns and 45 microns. Wrapping paper is beneficial in relation to keep the shape of the substrate during vaping. Without wrapping paper, the substrate tends to deform where it has heated the most. It is also able to keep the color of the substrate consistent.

Ideally, the paper sheet layer has a grammage greater than 5 $g/m^2$, preferably greater than 8 $g/m^2$, preferably greater than 10 $g/m^2$ and/or smaller than 25 $g/m^2$, preferably smaller than 20 $g/m^2$, preferably smaller than 15 $g/m^2$. Further, the paper sheet layer in particular has an air permeability above 1,100 $l/m^2$, preferably above 1,200 $l/m^2$, preferably above 1,300 $l/m^2$. Those properties ensure a transportation of a sufficient amount of aerosol from the substrate and through the paper sheet layer.

In a preferred embodiment, the aerosol releasing substrate is pressed into a stably shaped sheet. A sheet shaped substrate can be placed in an oven area of a heat-not-burn device by requiring less space compared to conventional substrate products.

In a further preferred embodiment, the sheet of aerosol releasing substrate is pressed to a thickness smaller than 5 mm, preferably smaller than 3 mm, preferably smaller than 1.5 mm. Ideally, the thickness of the sheet shaped substrate is 1-2 mm. A thickness of between 1 and 5 mm is important to ensure heat transfer throughout the substrate without requiring too much energy. Especially, because in certain devices, the sheet is heated from one side only of the sheet.

In another preferred embodiment, an additional further pressing step comprises forming grooves or recesses on at least one side of the sheet. Ideally, the grooves and/or recesses extend from a first edge to a second edge if the sheet shaped substrate, wherein the first edge opposes the second edge. Preferably, the grooves and/or recesses extend in length or width direction of the sheet shaped substrate. It is also possible that grooves and/or recesses have a closed contour circumscribed on the surface of the sheet shaped substrate, e.g. representing a brand, logo or image. The advantage is that a surface area of the substrate in contact with the oven is reduced to provide faster heating and the release of more aerosol. The slot is also able to provide airflow between the oven and the substrate to facilitate air coming in and convection heating.

In another preferred embodiment, the mold is preferably made of a metal or metal like material, preferably aluminum. It may also be possible that the mold is made of a plastic and/or composite material. Ideally, the mold is made of a material resistant to heat and pressure and to keep its shape under very high temperature and pressure conditions.

In another preferred embodiment, the mold consists of at least two parts, preferably more than two parts and in particular three parts, such as a frame, which defines a final thickness of the substrate, a bottom plate (e.g. female part) and a top plate (e.g. male part). Ideally, the parts are variable in shape and are changeable so that it is possible to use e.g. a first male part together with a fifth female part. With at least three variable parts of the mold, it is possible to use the mold for different purposes, e.g. to press different brands on the substrate.

In another preferred embodiment, the aerosol releasing substrate is a granular or foam material before pressing. Preferably, the aerosol releasing substrate is a granular material with particle sizes greater than 0.1 mm, preferably greater than 0.5 mm and preferably greater than 1.0 mm and/or particle sizes smaller than 10 mm, preferably smaller than 5 mm, and preferably smaller than 3 mm. The particle sizes of the aerosol releasing substrate are most preferred in the range of between 0.2 mm and 4 mm and especially preferred between 0.7 mm and 2 mm. The granules agglomerate after pressing and leave small interstices in the substrate, which are necessary to ensure an effective vape generation during smoking. Aerosol formers will leak less from granular substrate than from a foam substrate, which is also an advantage. It is also possible that the aerosol releasing substrate is a foam material. A foam structure comprises trapped bubbles as pores in an open or closed structure, wherein the bubbles may contain air and/or other gases such as nitrogen or oxygen. An open pored structure provides a large surface area enabling heat and aerosol to circulate through the foam and therefore enhance the extraction of flavors and stimulants during smoking, and particularly provides a soft formable consistence.

If the aerosol releasing substrate is a granular, tobacco particle sizes are greater than 0.1 mm, preferably greater than 0.2 mm and preferably greater than 0.4 mm and/or smaller than 1.5 mm, preferably smaller than 1 mm, and preferably smaller than 0.8 mm. The particle sizes of the aerosol releasing substrate are most preferred in the range of between 0.5 mm and 0.7 mm. Such sizes of tobacco particles are especially useful in terms of releasing aerosol. Small particles have higher external surfaces than larger sized particles and are therefore able to release much more aerosol than larger sized particles.

The afore-mentioned problems are eliminated by aerosol releasing substrate for use in a heat-not-burn device, which is air permeable and comprises, tobacco particles and/or an inhalable agent, which contains at least one of a stimulant and/or a flavor. The substrate also comprises a gelling agent for gelling the aerosol releasing substrate and a degradation preventing and/or thickening stabilizer, as well as 20-70% aerosol former. Further, the aerosol releasing substrate is a compressed mass. A compressed mass is useful and easy to handle for the users. In a compressed mass, particles are bond together and user just need to take one compressed tobacco article to put it into the heat-not-burn device.

Ideally, the tobacco particle sizes are greater than 0.1 mm, preferably greater than 0.2 mm and preferably greater than 0.4 mm and/or smaller than 1.5 mm, preferably smaller than 1 mm, and preferably smaller than 0.8 mm. The particle sizes of the aerosol releasing substrate are most preferred in the range of between 0.5 mm and 0.7 mm. Such sizes of tobacco particles are especially useful in terms of releasing aerosol. Small particles have higher external surfaces than larger sized particles and are therefore able to release much more aerosol than larger sized particles.

As the aerosol former produces aerosol when it is heated, the aerosol releasing substrate is capable of releasing a high amount of aerosol when it comprises aerosol former extending an amount of 10% of the composition of the substrate. The substrate is therefore able to produce much more aerosol/vape than conventional tobacco products. Beneficial to the high amount of aerosol former is that it is a compressed mass, which means that the aerosol releasing substrate is space-savingly placeable into heat-not-burn devices or other receptacles, such as receptacles for transportation and distribution of the substrate.

Preferably the weight of the tobacco and/or inhalable agent is greater than 5 wt.-%, preferably greater than 10 wt.-% and preferably greater than 20 wt.-% of the weight of the aerosol releasing substrate and/or the weight of the tobacco and/or inhalable agent is smaller than 70 wt.-%, preferably smaller than 60 wt.-%, preferably smaller than 51 wt. %, more preferably smaller than 40 wt.-% of the weight of the aerosol releasing substrate. Most preferred is an amount of tobacco of between 30% and 50% of the weight of the substrate. This ensures a sufficient amount of tobacco flavor and stimulant in the substrate. If the amount of tobacco is increased above e.g. 50 wt. % of the weight of the substrate, the amount of other constituents, e.g. aerosol former or stabilizer must be reduced, so that the substrate may become too brittle and unstable to keep the desired shape after pressing.

Preferably, the tobacco and/or inhalable agent can preferably be any compound, mixture, particle matter and/or solution that may be inhaled, for example as a gas and/or aerosol, and it e.g. includes and/or carries at least one of a stimulant, e.g. caffeine, guarana and combinations thereof. The tobacco may further contain essentially at least one sort of tobacco, preferred a blend of at least two or more different sorts of tobacco. With a blend of different sorts of tobacco, the taste is adjustable and can be adjusted to a preferred taste of the consumer.

Preferably, the inhalable agent and/or the flavor may contain menthol, natural and/or artificial plant flavors, saccharides, animal flavors, other flavorings known for use in conventional e-liquids e.g. cinnamon, sage, herb, chamomile, kudzu (Pueraria lobata), Hydrangeae dulcis folium, clove, lavender, cardamom, caryophyllus, nutmeg, bergamot, geranium, honey essence, rose oil, lemon, orange, cassia bark, caraway, jasmine, ginger, coriander, vanilla extract, spearmint, peppermint, cassia, coffee, celery, cascarilla, sandalwood, cocoa, ylang ylang, fennel, anise, licorice, St John's bread, prune extract, and peach extract; saccharides, e.g., glucose, fructose, isomerized saccharide, and caramel; cocoa, e.g., powder and extract; esters, e.g., iso-amyl acetate, linalyl acetate, isoamyl propionate, and linalyl butyrate; ketones, e.g., menthone, ionone, damascenone, and ethyl maltol; alcohols, e.g., geraniol, linalool, anethole, and eugenol; aldehydes, e.g., vanillin, benzaldehyde, and anisaldehyde; lactones, e.g., y-undecalactone and y-nonalactone; animal flavors, e.g., musk, ambergris, civet, and castoreum; and hydrocarbons, e.g., limonene and pinene, and combinations thereof, without being limited thereto. Such a flavor or others can be used alone or in combination. It is also possible that the inhalable agent and/or flavor and/or a combination of flavors may be combined with at least one or more sorts of tobacco, so that the taste of the substrate is adjustable to an optimum of a preferred taste of the consumer.

Preferably, the aerosol former comprises glycerol, propylene glycol, ethanol and/or water. It is also possible, that the aerosol former comprises other alcohols and/or glycol derivatives, sebacate esters, and/or mixtures thereof, without being limited thereto. A glycol derivative that can be used in certain embodiments is propylene glycol, and a suitable sebacate ester can be di-2-ethylhexyl sebacate. Furthermore, any possible combinations of compounds belonging to the above-mentioned classes can be used. For example, a combination of glycerol and propylene glycol can be used as aerosol forming agent. Most of these aerosol formers are tasteless and thus do not cover the original taste of tobacco, extracts of tobacco and/or inhalable agents, such as flavors. However, a tasteless aerosol former is still capable of generating aerosol and vape that carries the taste of the tobacco, extracts of tobacco and/or inhalable agents, such as flavors. Furthermore, the aerosol former contributes to the consistence and formability of the substrate.

Preferably, the stabilizer comprises carboxymethylcellulose and/or hydroxyalkylated carbohydrates. Preferably used is a purified carboxymethylcellulose, such as Ceroga 4550 C or CEKOL® 2000 (C.E. Roeper GmbH). Stabilizers, such as carboxymethylcellulose help to prevent degradation of the substrate and thickens it.

In a preferred embodiment, the gelling agent is a non-protein containing polysaccharide and/or comprise gellan gum, lecithin, agar and/or mixtures thereof. The gelling agent, especially gellan gum, and preferably gellan gum Roeper 700f, jellifies the substrate so that it is formable.

In a preferred embodiment, the aerosol former comprises glycerol, propylene glycol, ethanol and/or water. It is also possible, that the aerosol former comprises other alcohols and/or glycol derivatives, sebacate esters, and/or mixtures thereof, without being limited thereto. A glycol derivative that can be used in certain embodiments is propylene glycol, and a suitable sebacate ester can be di-2-ethylhexyl sebacate. Furthermore, any possible combinations of compounds belonging to the above-mentioned classes can be used. For example, a combination of glycerol and propylene glycol can be used as aerosol forming agent. Most of these aerosol formers are tasteless and thus do not cover the original taste of tobacco, extracts of tobacco and/or inhalable agents, such as flavors. However, a tasteless aerosol former is still capable of generating aerosol and vape that carries the taste of the tobacco, extracts of tobacco and/or inhalable agents, such as flavors. Furthermore, the aerosol former contributes to the consistence and formability of the substrate.

In a preferred embodiment, the ratio of propylene glycol and glycerol is between 80:20 and 20:80, preferably between 30:70 and 70:30, preferably between 40:60 and 60:40. The glycerol and propylene glycol can be used with equal weight percent, but also with different weight percent, preferably with more than 10%, preferred more than 30%, preferred more than 40% by weight of glycerol and less than 90%, preferred less than 80%, preferred less than 70% by weight of glycerol mixed with propylene glycol with more than 10%, preferred more than 30%, preferred more than 40% by weight, and less than 90%, preferred less than 80%, preferred less than 70% by weight.

Highly preferred is an excess of glycerol in relation to propylene glycol. It is possible that the amount propylene glycol is between 10% and 20% by weight of the substrate, wherein the amount of glycerol is between 20% and 30% by weight of the substrate. Thus, the two components can be suitably set regarding their ratio. The ratio of propylene glycol and glycerol influences the basic viscosity of the substrate, with a higher amount of glycerol leading to a higher viscosity and therefore to a better texture and formability of the substrate.

In a preferred embodiment, the aerosol releasing substrate has a sheet shape. A thin sheet is heatable very fast and the heat can be transported through the sheet within a short time frame. The aerosol releasing substrate thus has the ability to be heated fast and to release aerosol uniformly throughout the sheet.

In a preferred embodiment, the aerosol releasing substrate comprises grooves and/or recesses on a least one side of the sheet. Preferably, the aerosol releasing substrate has grooves and/or recesses on at least one side, preferably on two sides, which in particular means that the aerosol releasing substrate is single or double-side slotted. It is possible that the grooves and/or recesses extend from a first edge to an opposing second edge. Preferably, the grooves and/or recesses extend in a length or width direction of the aerosol releasing substrate. The grooves and/or recesses may also have a closed contour circumscribed on the surface of the sheet shaped aerosol releasing substrate, e.g. in the form of a brand, logo or image. The advantage of aerosol releasing substrate having grooves or recesses is to decrease a surface area in contact with an oven to provide faster heating and a higher release of aerosol. Grooves or recesses also can provide airflow between the oven and the aerosol releasing substrate to facilitate air coming in and convection heating.

In a preferred embodiment, the aerosol releasing substrate has a thickness greater than 0.1 mm, preferably greater than 0.3 mm, preferably greater than 0.5 mm and/or a thickness smaller than 5 mm, preferably smaller than 3 mm, preferably smaller than 1.5 mm. Ideally, the thickness of the aerosol releasing substrate is smaller than a width and/or a length of the aerosol releasing substrate. A thickness between 0.1 mm and 5 mm ensures a deliverability of a sufficient amount aerosol during smoking.

In a preferred embodiment, the aerosol releasing substrate has a width greater than 5 mm, preferably greater than 8 mm, preferably greater than 10 mm and/or a width smaller than 30 mm, preferably smaller than 20 mm, preferably smaller than 15 mm and a length greater than 5 mm, preferably greater than 8 mm, preferably greater than 10 mm and/or a length smaller than 30 mm, preferably smaller than 20 mm, preferably smaller than 15 mm. Rectangular substrates with a width and/or a length between 5 and 20 mm fit best into heat-not-burn devices. However, it is also possible that the aerosol releasing substrate is oval or circular with a radius greater than 5 mm, preferably greater than 8 mm, preferably greater than 10 mm and/or smaller than 30 mm, preferably smaller than 20 mm, preferably smaller than 15 mm. Substrates with a width and/or a length fit best into heat-not-burn devices. Larger or smaller substrates are difficult to use in common heat-not-burn devices.

In a preferred embodiment, the aerosol releasing substrate is used to deliver aerosol when heated by an oven at volatilization temperatures of the aerosol former in a heat-not-burn device. When the aerosol releasing substrate is used to deliver aerosol in a heat-not-burn device consumers will have a good smoking experience with an intensive taste.

BRIEF DESCRIPTION OF THE DRAWINGS

Further advantages, objectives and features of the present invention will be described, by way of example only, in the following description with reference to the appended figures. In the figures, like components in different embodiments can exhibit the same reference symbols.

The figures show.

DETAILED DESCRIPTION

Figure 1:
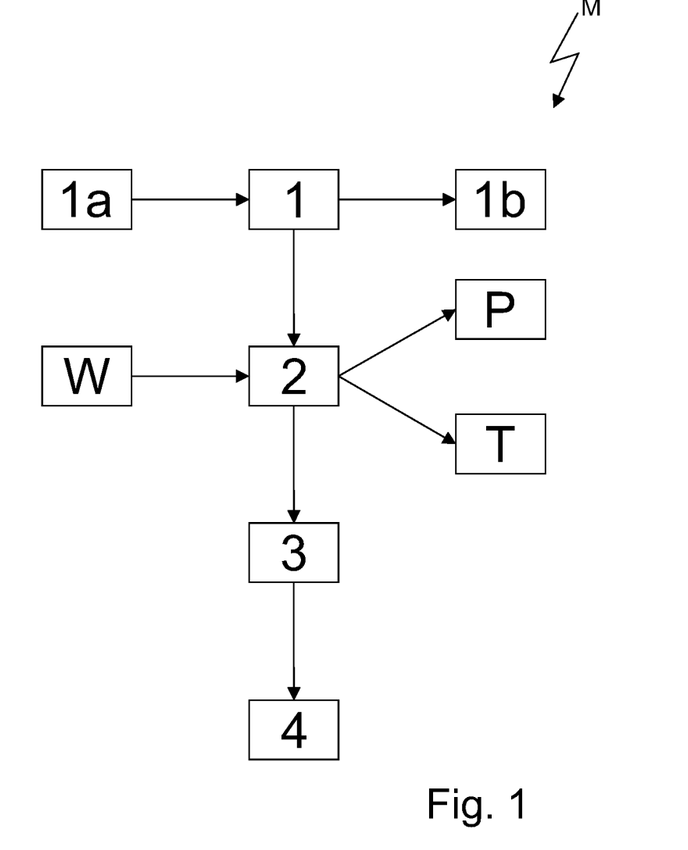
FIG. 1 A method to bring an aerosol releasing substrate into a stable shape illustrated in a chart.

In FIG. 1 a method M to bring an aerosol releasing substrate into a stable shape 4 is illustrated. In first step 1, the aerosol releasing substrate is produced. Preferably the aerosol releasing substrate contains between 30% and 60%, ideally between 40% and 50% aerosol former by weight of the aerosol releasing substrate. The aerosol former ideally comprises between 2% and 6% water as well as between 10% and 20% propylene glycol and between 20% and 30% glycerol by weight of the substrate. The aerosol former further comprises water in an amount greater than 1%, preferably greater than 2%, preferably greater than 3% and/or smaller than 20%, preferably smaller than 10%, preferably smaller than 6% and ideally between 2% and 5% by weight of the aerosol releasing substrate.

Preferably, the aerosol releasing substrate contains a gelling agent, in particular in the form of gellan gum, in an amount greater than 2%, preferably equal to or greater than 4% and/or smaller than 12%, preferably smaller than 10%, preferably smaller than 8% and ideally between 5% and 8% by weight of the aerosol releasing substrate. For relatively high tobacco content such as above 45 wt. %, for example of about 50 wt. %, the gellan gum may be present in an amount of about 3 to 6 wt. %, preferably of about 3.5 to 5.5 wt. %.

The aerosol releasing substrate further comprises a degradation preventing and/or thickening stabilizer, especially based on cellulose and in particular based on a cellulose derivate, in an amount greater than 8%, preferably greater than 10%, preferably equal to or greater than 12% and/or smaller than 30%, preferably smaller than 25%, preferably smaller than 20% and ideally between 14% and 18% by weight of the aerosol releasing substrate. For relatively high tobacco content such as above 40 wt. %, such as about 50 wt. %, the stabilizer may be present in an amount of about 8 to 15 wt. %, preferably of about 10 to 13 wt. %.

Ideally, a content of tobacco and/or inhalable agent in the aerosol releasing substrate is greater than 5%, preferably greater than 10% and preferably greater than 20% and/or smaller than 70%, preferably smaller than 60%, preferably smaller than 40% and ideally, between 30% and 40% by weight of the aerosol releasing substrate. The sizes of tobacco particles are preferably below 800 μm, preferably below 700 μm and ideally, below 600 μm.

After the ingredients of the aerosol releasing substrate have been mixed and processed to provide the aerosol releasing substrate, the aerosol releasing substrate is preferably brought into a granular form 1a with preferred granular sizes between 1 mm and 3 mm. It is also possible, that the aerosol releasing substrate has a foam structure 3b before pressing.

In a second step 2, the aerosol releasing substrate is pressed into a solid and stable form. A mold with a male and a female part is used to press the aerosol releasing substrate into its desired shape. The mold provides slots, with which the aerosol generating substrate is pressed into a sheet shaped form with grooves and/or recesses. Preferably the slots are arranged in air-flow direction. Ideally, the aerosol releasing substrate is pressed together with paper layers W, wherein each paper layer preferably has a grammage between 10 g/m² and 15 g/m², a thickness between 40 μm and 45 μm, an air permeability below 1.100 I/m² and/or a moisture below 7%. Preferably, the substrate is pressed together with at least a first paper layer on a first side and, in particular a second paper layer on an opposing second side of the pressed substrate.

The aerosol releasing substrate is pressed under conditions with a temperature T that is in the range of between 90° C. and 120° C. and/or a pressure P that is between 5 and 15 bars.

Figure 2:
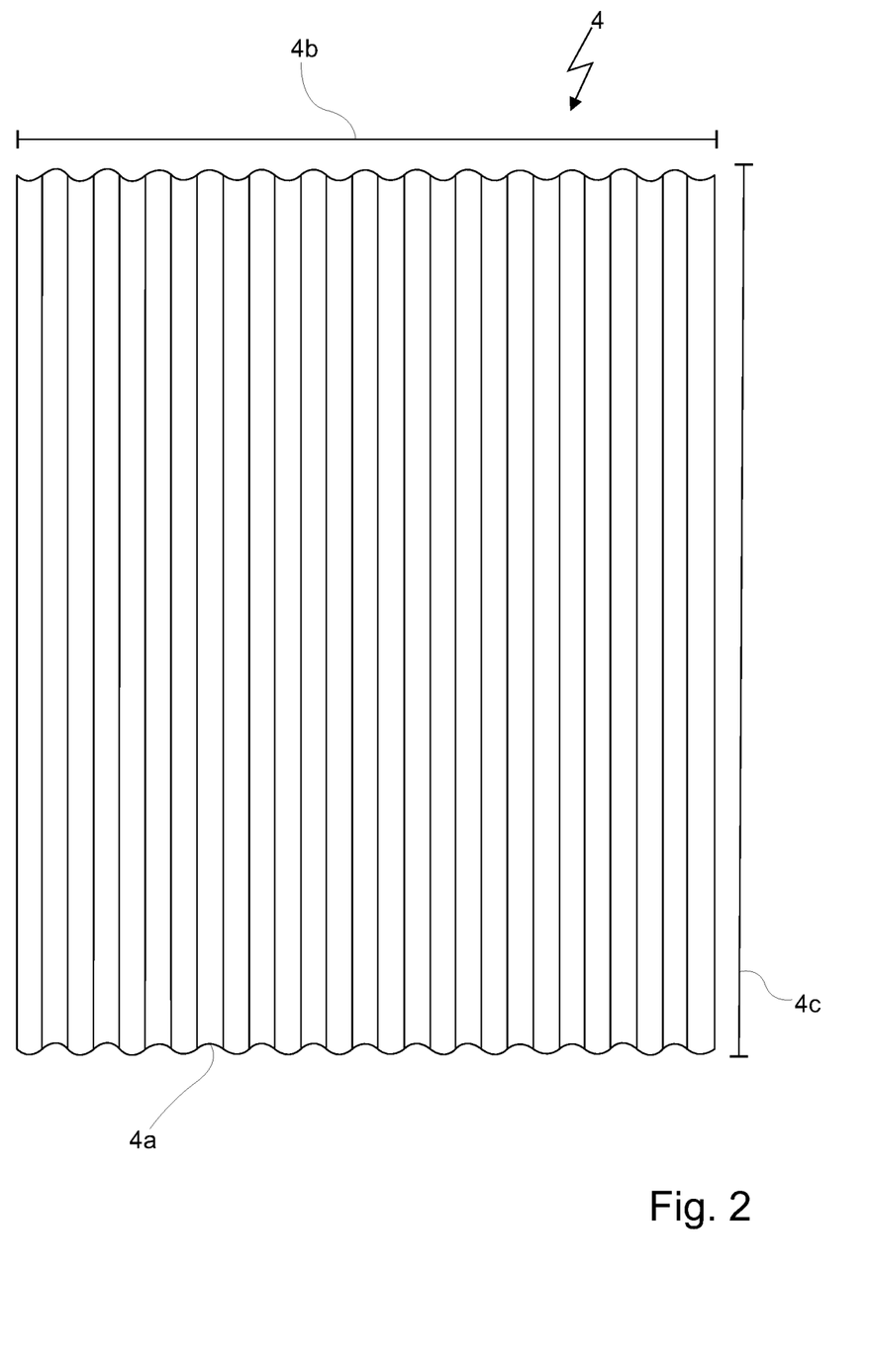
FIG. 2 A schematic view of a compressed aerosol releasing substrate.

After pressing the aerosol releasing substrate to a desired thickness of between 1 mm and 2 mm, it is cut in a third step 3 to a desired final shape 4 shown in FIG. 2. Ideally, the compressed aerosol releasing substrate 4 in its final shape has a weight greater than 50 mg, preferably greater 100 mg, preferably greater than 150 mg and/or lower than 400 mg, preferably lower than 350 mg, preferably lower than 300 mg.

After cutting 3 the compressed aerosol releasing substrate 4 is rectangular with a width 4b and/or length 4c between 10 mm and 20 mm (see FIG. 2). Preferably, the compressed aerosol releasing substrate 4 has grooves 4a and/or recesses, which extend in length 4c or width 4d direction of the sheet shaped substrate 4. The grooves and/or recesses are arranged on a first and/or second side, which opposes the first side. Ideally, the thickness of the compressed aerosol releasing substrate is smaller than the width 4b and/or the length 4c of the aerosol releasing substrate. Preferably, the width 4b is equal to, larger or smaller than the length 4d of aerosol releasing substrate.

In general, the substrate weight is correlated with TPM (Total Particle Matter) and with heat up time before the first puff. The higher the weight the more TPM released and the longer the heat-up time. The shape has no significant impact on TPM but slotted substrate required less heat-up time. However, for a same amount substrate and same heating conditions, the TPM of the substrate of the invention is higher than the TPM of a standard tobacco reconstituted substrate.

EXAMPLES

The following two examples show preferred embodiments of the aerosol releasing substrate. The following numbers are given in wt. % calculated with respect to the overall weight of the complete mixture.

Example 1

A preferred embodiment of the aerosol releasing substrate comprises:
33.0% tobacco particles,
6.8% gellan gum,
16.4% binder,
3.8% water,
24.0% glycerin,
16.0% propylenglycol.

The tobacco particles comprise nicotine as the stimulant. The tobacco particle size in this example is preferably 600 μm. The water is used to activate the binder, which together form the thickening stabilizer. Preferably, the binder is carboxymethyl cellulose (CMC), more preferred Ceroga 4550 C.

Example 2

Another preferred embodiment of the aerosol releasing substrate comprises:
49.0% tobacco particles,
4.7% gellan gum,
11.7% binder,
2.8% water,
19.3% glycerin,
12.5% propylenglycol.

The tobacco particles comprise nicotine as the stimulant. Due to the higher amount of tobacco particles, the nicotine release is higher in comparison to example 1 together with a higher sensorial impact than example 1. The tobacco particle size in this example is preferably 600 μm. The water is used to activate the binder, which together form the thickening stabilizer. Preferably, the binder is carboxymethyl cellulose (CMC), more preferred Ceroga 4550 C. The aerosol releasing substrates of examples 1 and 2 comprise the same visual and tactile properties.

In the following an example of a preferred embodiment of the method to produce the aerosol releasing substrate is presented. This preferred embodiment of the method is preferably combined with one of the above given examples 1 and 2.

First the propylene glycol, the glycerin and the water are mixed in a mixing bowl of a Kenwood mixer and mixed for 3 minutes with a mixing speed on level 5. Subsequently, the gellan gum is added to the mixture at a minimum mixing speed and then mixed with the other ingredients for 3 minutes with a mixing speed on level 5. Next, the tobacco particles are added to the mixture at a minimum mixing speed and then mixed with the other ingredients for 3 minutes with a mixing speed on level 5. Subsequently, the binder is added to the mixture, preferably at a minimum mixing speed, and then mixed with the other ingredients for 1 minute with a mixing speed on level 5. Afterwards, the mixing bowl is removed from the mixer and the mixture is further mixed by hand, or in alternative to that in the mixer at a minimum mixing speed, until a homogeneous color of the mixture is achieved. Next, the mixture is stored in a closed container for 24 hours. Subsequently the mixture is sieved through a 1.7 mm sieve for 5 minutes at 280 rpm. This sieving step is repeated until all of the mixture is sieved. Now the aerosol releasing substrate is finished. The aerosol releasing substrate now preferably comprises a moisture content of 15.94%. Subsequently, the aerosol releasing substrate is pressed with pressure and heat and by using a mold into the desired shape.

The applicant reserves his right to claim all features disclosed in the application document as being an essential feature of the invention, as long as they are new, individually or in combination, in view of the prior art. Furthermore, it is noted that in the figures features are described, which can be advantageous individually. Someone skilled in the art will directly recognize that a specific feature being disclosed in a figure can be advantageous also without the adoption of further features from this figure. Furthermore, someone skilled in the art will recognize that advantages can evolve from a combination of diverse features being disclosed in one or various figures.

LIST OF REFERENCE SYMBOLS

1. Step 1
1a. Granular aerosol releasing substrate
1b. Foam structured aerosol releasing substrate
2. Step 2
3. Step 3
4. Compressed aerosol releasing substrate
4a. Grooves/Recesses
4b. Width
4c. Length
M. Method to bring an aerosol releasing substrate into a stable shape
P. Pressure
T. Temperature
W. Paper layer

The invention claimed is:

1. A method to bring an aerosol releasing substrate for use in a heat-not-burn device into a stable shape, wherein the aerosol releasing substrate comprises:
20-70% aerosol former,
tobacco particles and/or an inhalable agent, which contains at least one of a stimulant and/or a flavor,
a gelling agent for gelling the aerosol releasing substrate and
a degradation preventing and/or thickening stabilizer, comprising the steps of:
a. producing said aerosol releasing substrate into a granular form, and
b. pressing, between a first plate and a second plate of a mold, the granular aerosol releasing substrate with pressure and heat into a shape.

2. The method according to claim 1, wherein:
temperatures T above 60° C. and temperatures T below 200° C. are used.

3. The method according to claim 1, wherein:
the aerosol releasing substrate is pressed in the mold by press forming the substrate under pressures above 1 bar and pressures below 50 bars.

4. The method according to claim 1, wherein:
the aerosol releasing substrate is wrapped in paper sheet layer.

5. The method according to claim 1, wherein:
the aerosol releasing substrate is pressed into a stably shaped sheet.

6. The method according to claim 5, wherein:
the sheet of aerosol releasing substrate is pressed to a thickness smaller than 5 mm.

7. The method according to claim 5, wherein:
the step of pressing further comprises forming grooves or recesses on at least one side of the sheet.

8. The method according to claim 1, wherein:
the substrate is produced by adding the gelling agent in an amount greater than 2% and smaller than 12% by weight of the aerosol releasing substrate.

9. The method according to claim 1, wherein:
the substrate is produced by adding the degradation preventing and/or thickening stabilizer in an amount greater than 8% and smaller than 30% by weight of the aerosol releasing substrate.

10. The method according to claim 1, wherein: the step of producing includes mixing the aerosol former with the tobacco particles and/or the inhalable agent, the gelling agent and the degradation preventing and/or thickening stabilizer to create a mixture, followed by aging the mixture for at least 4 hours.

\* \* \* \* \*